United States Patent
Javadekar et al.

(10) Patent No.: US 9,329,958 B2
(45) Date of Patent: May 3, 2016

(54) EFFICIENT INCREMENTAL CHECKPOINTING OF VIRTUAL DEVICES

(71) Applicant: VMware, Inc., Palo Alto, CA (US)

(72) Inventors: Shrinand Suresh Javadekar, Sunnyvale, CA (US); Michael Nelson, Alamo, CA (US)

(73) Assignee: VMware, Inc., Palo Alto, CA (US)

( * ) Notice: Subject to any disclaimer, the term of this patent is extended or adjusted under 35 U.S.C. 154(b) by 238 days.

(21) Appl. No.: 14/095,032

(22) Filed: Dec. 3, 2013

(65) Prior Publication Data

US 2015/0154081 A1    Jun. 4, 2015

(51) Int. Cl.
G06F 17/30 (2006.01)
*G06F 11/14* (2006.01)
*G06F 11/20* (2006.01)

(52) U.S. Cl.
CPC ........ *G06F 11/2097* (2013.01); *G06F 11/1484* (2013.01); *G06F 11/1438* (2013.01); *G06F 11/2038* (2013.01)

(58) Field of Classification Search
CPC combination set(s) only.
See application file for complete search history.

(56) References Cited

U.S. PATENT DOCUMENTS

| | | | |
|---|---|---|---|
| 8,359,594 B1 * | 1/2013 | Davidson | G06F 9/5077 709/218 |
| 8,533,382 B2 | 9/2013 | Scales et al. | |
| 8,549,241 B2 | 10/2013 | Scales et al. | |
| 2011/0126047 A1 * | 5/2011 | Anderson | H04L 9/3213 714/15 |
| 2011/0167195 A1 | 7/2011 | Scales et al. | |
| 2014/0325170 A1 * | 10/2014 | Aswathanarayana | G06F 9/45558 711/162 |

\* cited by examiner

*Primary Examiner* — Shyue Jiunn Hwa

(57) ABSTRACT

A virtualization platform provides fault tolerance for a primary virtual machine by continuously transmitting checkpoint information of the primary virtual machine to a collector process, such as a backup virtual machine. The virtualization platform includes virtual devices configured to keep track of state changes, for example, by using state flags or saving copies of prior state data. The virtualization platform generates incremental checkpoints by querying the virtual devices, which return state data based on whether the virtual devices have changed state since a prior checkpoint operation.

18 Claims, 4 Drawing Sheets

EFFICIENT INCREMENTAL CHECKPOINTING OF VIRTUAL DEVICES

BACKGROUND

Techniques for generating and storing a "snapshot" or "checkpoint" of the state of a virtual machine (VM) allows the operation of the VM to be resumed at a later time from the point in time at which the snapshot or checkpoint was taken. Example uses for checkpointing includes providing a backup of some aspect of a computer system and providing the ability to revert back to a previously generated checkpoint to undo changes to some aspect of a computer system or to recover from a failure affecting the computer system.

Fast and frequent checkpointing of virtual machines may be desirable for a number of applications. For example, continuous checkpointing allows users to revert back their application to almost any previous point in time. Reverse debugging based on deterministic replay also requires frequent checkpoints to reduce the amount of replay from a previous checkpoint that is required to execute backwards. Fast checkpoints can enable the possibility of speeding up an application by allowing speculative calculations that can be reverted if necessary. Furthermore, fast checkpoints may provide a way of providing fault tolerance, especially in cases of symmetric multiprocessing (SMP) virtual machines.

SUMMARY

One or more embodiments disclosed herein provide a method for generating a checkpoint for a virtual machine having a plurality of virtual devices. The method includes generating a first checkpoint for a virtual machine (VM) comprises state data of the plurality of virtual devices. The method further includes generating a second checkpoint for the VM, wherein the second checkpoint comprises state data of a first virtual device of the plurality of virtual devices that has changed since generation of the first checkpoint. Further embodiments of the present disclosure include a non-transitory computer-readable storage medium that includes instructions that enable a processing unit to implement one or more of the methods set forth above or the functions of the computer system set forth above.

DETAILED DESCRIPTION

One or more embodiments of the present disclosure provide techniques to frequently transmit an updated state of a primary VM to a "collector process." In certain of such embodiments, the collector process is a backup VM (i.e., thereby enabling immediate resumption of the primary VM upon a failure). The execution of the primary VM is frequently and periodically suspended during the course of execution to determine any modifications made to the state of the primary VM, which includes the state of the multitude of virtual devices of the primary VM, since the prior checkpoint. As used herein, suspending a VM is also referred to as "stunning" the VM, and resuming the VM is also referred to as "unstunning" the VM. Once the modifications (sometimes referred to herein as "checkpoint information") are determined, they are transmitted to the backup VM which is then able to merge the modifications into its current state, thereby reflecting an accurate state of the primary VM at the time of the checkpoint.

Checkpointing and saving all the states of the many virtual devices and sending the state data to a backup VM in every checkpoint may be time-expensive, for example, in some cases, taking several milliseconds, thereby making frequent checkpointing and fault tolerance impractical for SMP-based VMs. Accordingly, in order to determine modifications, embodiments described herein include virtual devices of the primary VM that have been modified to keep track of its respective state changes. Such embodiments reduce the amount of time used to generate checkpoint information and save states of the virtual devices, and enable frequent checkpointing techniques for providing fault tolerance for SMP based VMs, which may not be able to utilize conventional non-deterministic instruction stream record-replay techniques.

Figure 1:
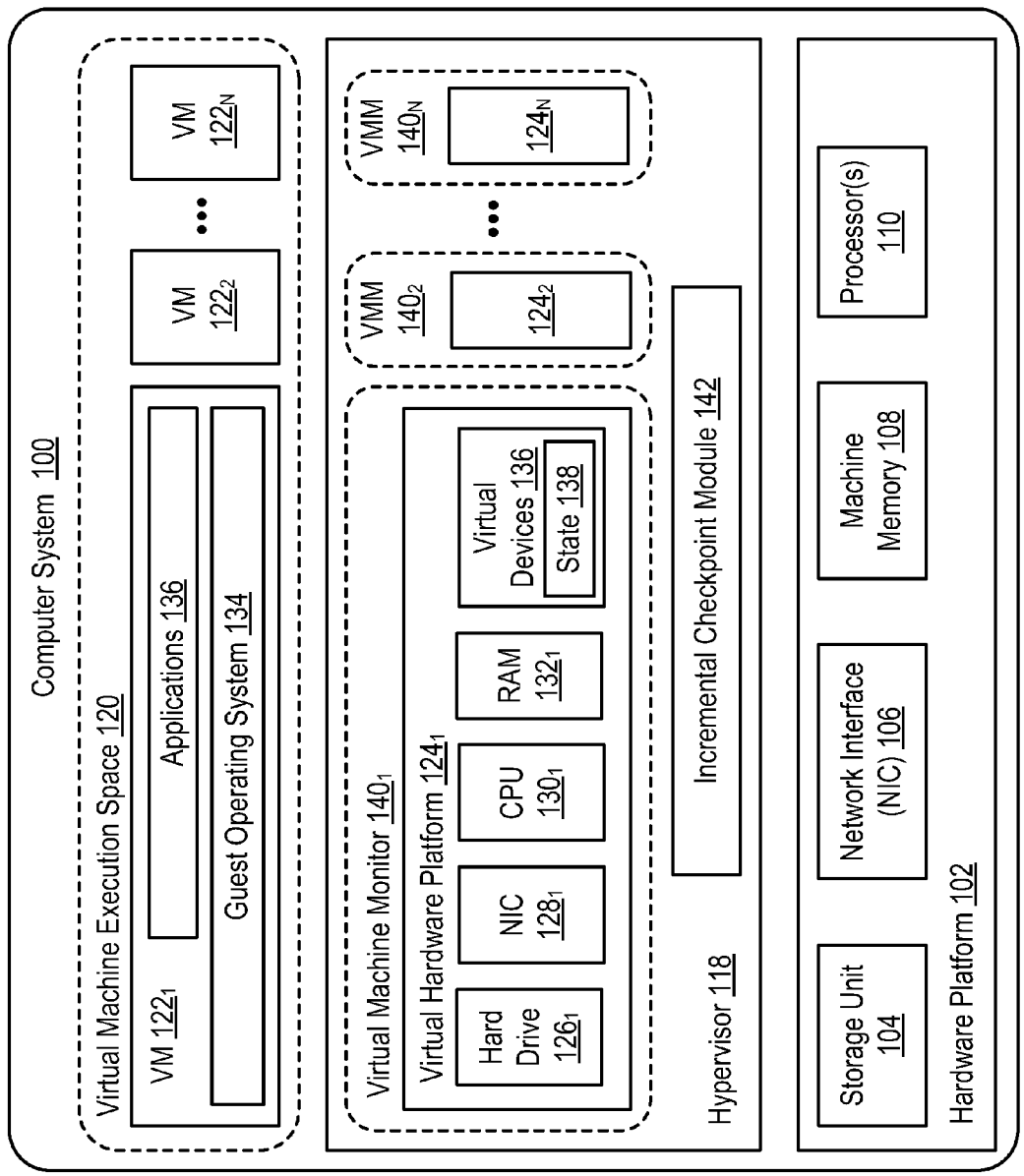
FIG. 1 is a block diagram that illustrates a virtualized computing system with which one or more embodiments of the present disclosure may be utilized.

FIG. 1 depicts a block diagram of a virtualized computer system 100. A host computer system 100 may be constructed on a desktop, laptop or server grade hardware platform 102 such as an x86 architecture platform. Such a hardware platform may include a local storage unit 104, such as a hard drive, a network adapter (NIC 106), system memory 108, a processor 110 and other I/O devices such as, for example and without limitation, a mouse and keyboard (not shown in FIG. 1). In some embodiments, processor 110 may be a symmetric multi-core processor having multiple CPUs which operate concurrently and can read and write to any portion of system memory 108.

A virtualization software layer, also referred to hereinafter as hypervisor 118, is installed on top of hardware platform 102. Hypervisor 118 supports a virtual machine execution space 120 within which multiple VMs may be concurrently instantiated and executed. As shown, virtual execution space 120 includes VMs $122_1$-$122_N$. For each of VMs $122_1$-$122_N$, hypervisor 118 manages a corresponding virtual hardware platform (i.e., virtual hardware platforms $124_1$-$124_N$) that includes a plurality of virtual devices that emulate hardware, such as a virtual hard drive $126_1$, virtual NIC $128_1$, virtual CPUs $130_1$, virtual RAM $132_1$, and other virtual devices (represented generically by virtual device $136_1$) for VM $122_1$. For example, virtual hardware platform $124_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 134 to execute any supported application in application layer 135 for user VM $122_1$. Guest operating system 134 of VM $122_1$ includes device drivers (e.g., pre-existing device drivers available for guest operating system 134 etc.) that interact with emulated devices in virtual hardware platform $124_1$ as if such emulated devices were actual physical devices. Hypervisor 118 is responsible for transforming requests from device drivers in guest operating system 134 that are received by emulated devices in virtual platform 124₁, into corresponding requests to corresponding physical devices in hardware platform 102.

In one embodiment, the plurality of virtual devices of virtual hardware platform 124 may be implemented as device emulation code configured to emulate components of physical hardware platform 102. In addition to the virtual devices described above, the plurality of virtual devices may also include a virtual keyboard device, a virtual mouse or pointing device, virtual port devices (e.g., virtual serial port device, virtual parallel port device), a virtual sound card, a virtual USB device, virtual CD-ROM/DVD/floppy devices, virtual SCSI controller devices, virtual PCI or PCIe devices, and virtual timer devices, such as virtual programming interval timer (PIT) devices, virtual CMOS real time clock (RTC) devices, virtual advanced programmable interrupt controller (APIC) timers, virtual advanced configuration and power interface (ACPI) timer, virtual time stamp counter (TSC), and virtual high precision event timer (HPET).

In one embodiment, hypervisor 118 may include an incremental checkpoint module 142 configured to generate one or more checkpoints which capture the state of a particular VM at a particular point in time. The generated checkpoints may be utilized for a variety of purposes, such as, in VM snapshots written to disk, or transmitted to secondary systems that provide a failover for VMs. In one or more embodiments, incremental checkpoint module 142 is configured to generate incremental checkpoints which contain modifications to the state of a particular VM since a prior checkpoint. A checkpoint may include state data of each of the plurality of virtual devices 136 at a particular time, while an incremental checkpoint includes state data of each of the plurality of virtual devices 136 that have been modified since the prior checkout. To generate an incremental checkpoint, incremental checkpoint module 142 may use a list of virtual devices 136, and for each item in the list, query each virtual device for state data, and, if the virtual device has been modified, store the state data in a buffer or other data structure used to gather together the checkpoint.

In one or more embodiments, virtual devices 136 for a VM 122 may be configured to keep track of changes in device state 138. Each virtual device 136 may include a mechanism for identifying whether the virtual device has changed its state since a last checkpoint. Each virtual device 136 may be queried (e.g., by an incremental checkpoint module 142 described below) to provide state data associated with the virtual device, or in some cases, provide an indication that the state of the virtual device has not been changed since the last checkpoint (i.e., since the previous query.)

In some embodiments, one or more virtual devices 136 for a VM 122 maintains a data structure, such as a flag or bit field, that indicates whether the state of the virtual device has been changed since a last query. Virtual devices 136 are configured to detect whenever the device state is changed and to set a value of the data structure each time. When virtual devices 136 are queried to find out whether the state of the virtual device has changed, virtual device 136 may return the value of the data structure and reset the value of the data structure (e.g., to zero or FALSE) so that the virtual device can track state changes for the next checkpoint (i.e., until the next query).

In one example, one of virtual devices 136 may be a virtual keyboard device which has a state that is modified whenever a user is interacting with the VM. The virtual keyboard device may implement a flag (i.e., "stateModified") that indicates whether the state of the virtual keyboard device has changed. When a key press event is generated or when guest OS 134 acknowledges a keyboard interrupt and reads data from the buffer of the virtual keyboard device, the virtual keyboard emulation sets the stateModified flag to be TRUE. In some scenarios, a user may set up a VM to run some workload but does not interact with the VM. In such cases, the virtual keyboard device does not set the stateModified flag, and when queried returns an indication that the state of the virtual keyboard device is unchanged, thereby avoiding unnecessary read and write operations for the state of the virtual keyboard device.

In some embodiments, one or more virtual devices 136 for a VM 122 maintain a copy of the device state from a previous checkpoint. A particular virtual device 136 may be configured to save a copy of the state of the virtual device when a checkpoint is taken (e.g., when queried). When virtual device 136 is queried to find out whether the state of the virtual device changed, the current device state of the virtual device may be compared with the state that was saved from the last checkpoint. For example, the plurality of virtual devices may include a virtual parallel port device, the state of which is present in a fast user ports array. Each time a checkpoint is taken, a copy of this array is generated and kept aside by the virtual parallel port device. When a next checkpoint is taken, the value of the fast user ports array at that time in which the next checkpoint is taken is compared with the copy with that was created in the previous checkpoint. If the copies match, the virtual parallel port device has not changed state and need not be saved in an incremental checkpoint.

It should be recognized that, in some embodiments, virtual computing systems 100 may include a plurality of virtual devices, in which some virtual devices are configured to maintain a "state modified" flag, while other virtual devices are configured to maintain a copy of previous device state (and some virtual devices may not identify at all if the virtual device state has changed). Virtual devices 136 may be configured to use one of the mechanisms described herein based upon the properties and performance profile of the virtual device. For example, virtual devices having state data that may be contained in a small data structure (e.g., a few bytes) may be configured to maintain a copy of the virtual device state, because storing a previous copy of state data would not be costly storage-wise. It should be recognized that some virtual devices of the plurality of virtual devices 136 may frequently change state, for example, such as a virtual timer device. Such frequently-updated virtual devices may be configured to always return state data and be included within every checkpoint, since checkpoints are taken after some amount of time has lapsed and the frequently-modified virtual devices would always report a changed state anyway.

It should be recognized that the various terms, layers and categorizations used to describe the virtualization components in FIG. 1 may be referred to differently without departing from their functionality or the spirit or scope of the invention. For example, virtual hardware platforms 124₁-124ₙ may be considered to be part of virtual machine monitors (VMM) 140₁-140ₙ which implement the virtual system support needed to coordinate operations between hypervisor 118 and their respective VMs. Alternatively, virtual hardware platforms 124₁-124ₙ may also be considered to be separate from VMMs 140₁-140ₙ, and VMMs 140₁-140ₙ may be considered to be separate from hypervisor 118. One example of hypervisor 118 that may be used is included as a component of VMware's ESX™ product, which is commercially available from VMware, Inc. of Palo Alto, Calif. It should further be recognized that other virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives such as hard drive $126_1$.

Figure 2:
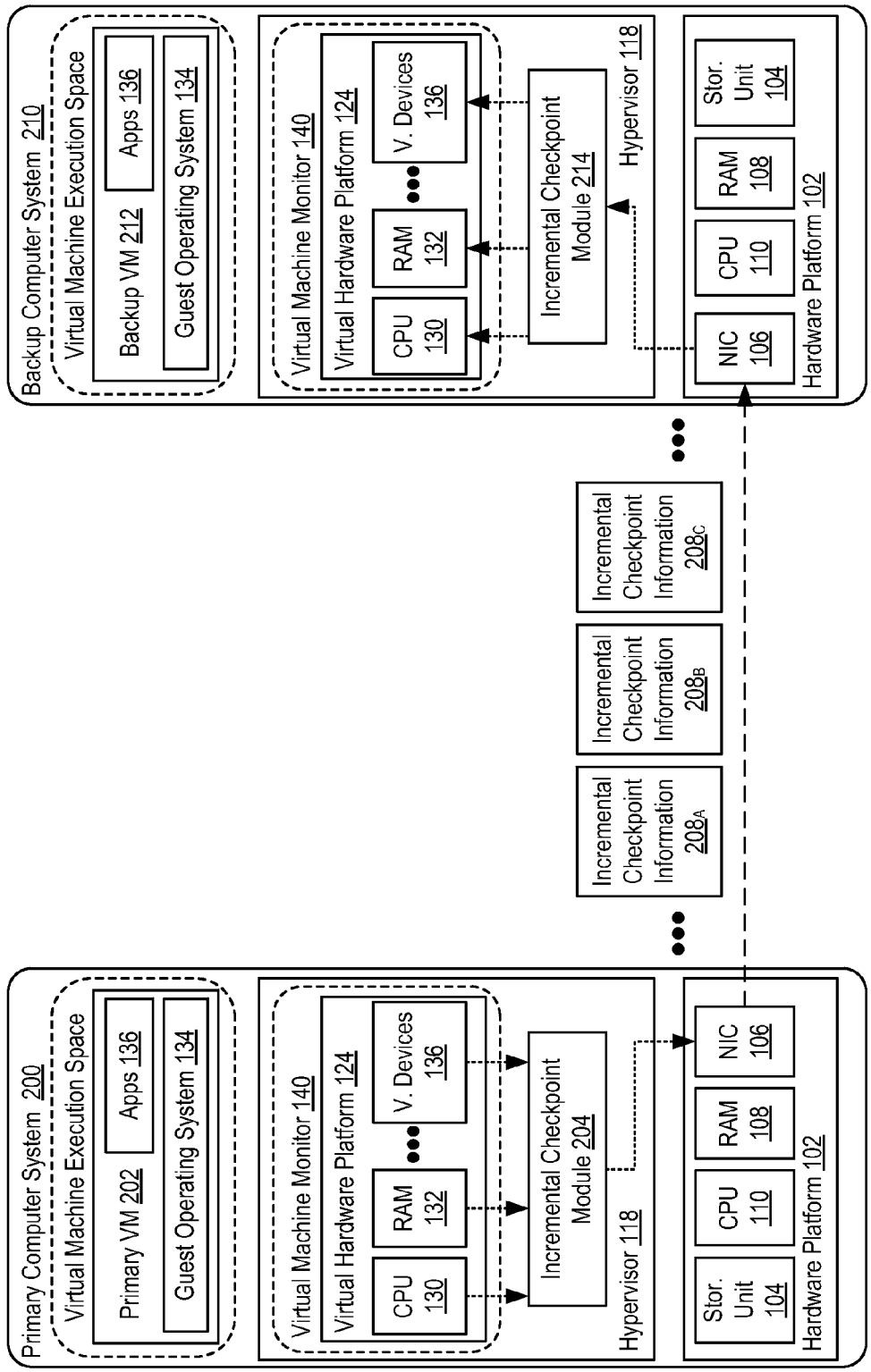
FIG. 2 is a block diagram that a primary virtual machine (VM) and a backup VM engaged in incremental and continuous checkpointing, according to one embodiment of the present disclosure.

FIG. 2 depicts a block diagram of a primary VM and backup VM engaged in incremental and continuous checkpointing. In one embodiment, both a primary and a backup VM are implemented in separate physical computer systems 200, 210 similar to the virtualized computer system of FIG. 1. A primary computer system 200 hosts a primary VM 202 and includes an incremental checkpoint module 204 in its hypervisor 118 (e.g., similar to incremental checkpoint module 142). Incremental checkpoint module 204 continually and frequently transmits incremental checkpoint information packets (see, e.g., $208_A$ to $208_C$) over a network to a backup computer system 210 that hosts backup VM 212. Each checkpoint information packet includes information reflecting changes in the state of virtual memory 132 and virtual devices 136 of primary VM 202 from the prior transmitted incremental checkpoint information packet. On backup computer system 210, incremental checkpoint module 214 ultimately receives each of the transmitted checkpoint information packets and accordingly updates the state of the memory and emulated devices of backup VM 212 based on the checkpoint information packets. In one embodiment, initiation of the transmission of checkpoint information packets by incremental checkpoint module 204 occurs frequently, for example, once every 10 milliseconds.

Figure 3:
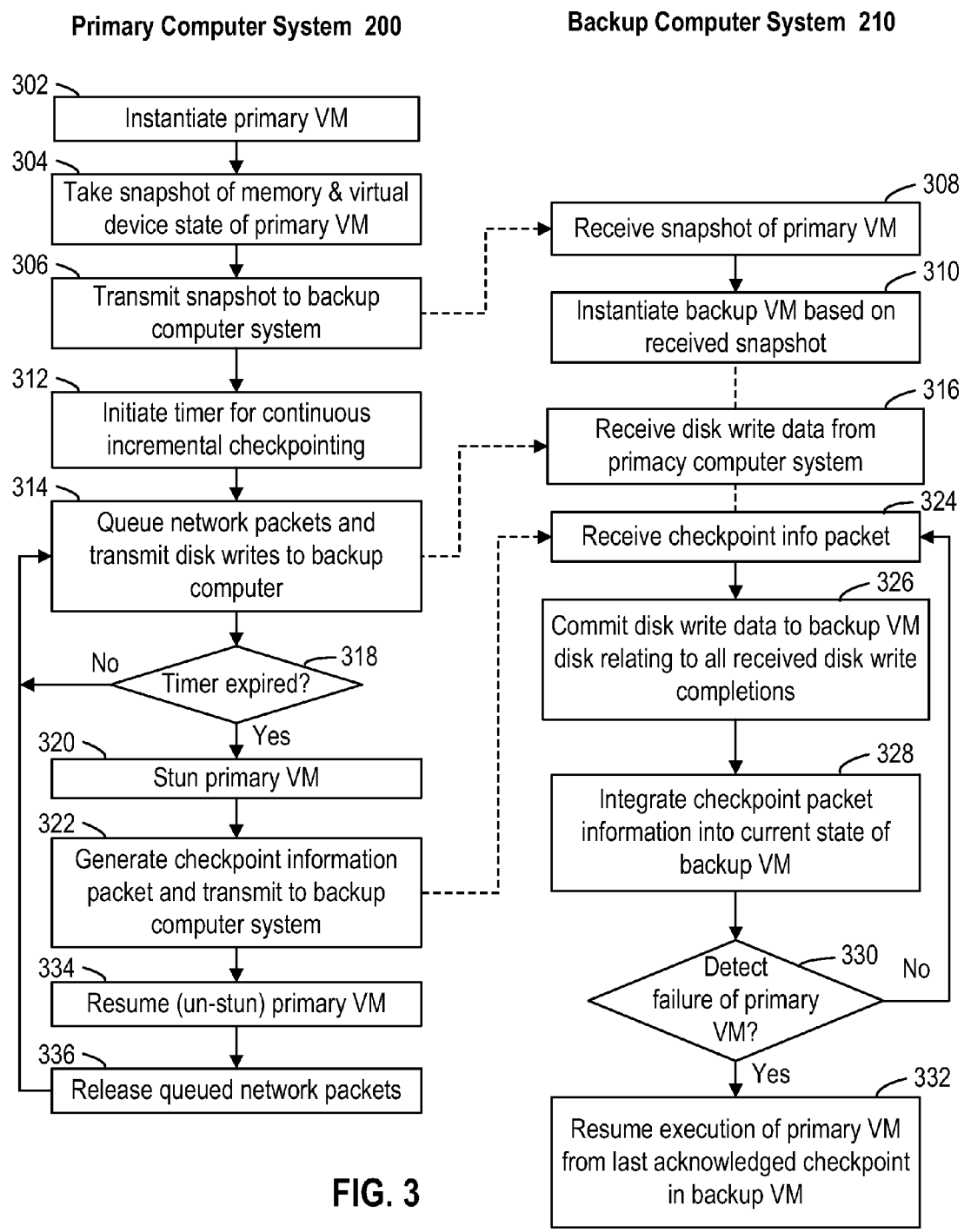
FIG. 3 is a flow diagram depicting a method for transmitting incremental and continuous checkpoint information packets from a primary VM to a backup VM.

FIG. 3 depicts a flow diagram of a method for transmitting incremental and continuous checkpoint information packets from a primary VM to a backup VM. It should be recognized that, even though the method is described in conjunction with the system of FIG. 2, any system configured to perform the method steps is within the scope of embodiments of the disclosure.

In step 302, the hypervisor of primary computer system 200 instantiates a primary VM 202. In step 304, incremental checkpoint module 204 of primary computer system 200 takes an initial snapshot of the state of primary VM 202 (e.g., state of virtual memory and all emulated virtual devices, etc.) and transmits the snapshot to backup computer system 210 in step 306. For example, in an embodiment utilizing VMware's ESX™ virtualization platform, VMware's VMotion technology can be used to create and transmit this initial snapshot. In step 308, backup computer system 210 receives the snapshot and its hypervisor instantiates a backup VM 212 based upon the snapshot in step 310.

In step 312, incremental checkpoint module 204 associated with primary VM 202 initiates a timer to frequently trigger the initiation of checkpoints and generate checkpoint information packets (e.g., every 10 milliseconds, etc.). Primary VM 202 may proceed to resume ordinary operations, which may include interactions with and modifications to one or more virtual devices 136 of primary VM 202. In one embodiment, hypervisor 118 of primary VM 202 may detect a change to the state data of a virtual device 136, and modify a state flag (e.g., "state-modified" flag) associated with that virtual device to indicate the state of that virtual device has been changed (i.e., since the prior checkpoint, or in this case, the initial checkpoint made at step 304). In one implementation, virtual device 136 may set a value (e.g., TRUE) for the state flag associated with virtual device 136 to indicate the state has been modified.

In step 314, prior to the expiration of the timer, the hypervisor may delay and queue any and all outbound network packets generated by primary VM 202. In some embodiments, prior to the expiration of the timer, incremental checkpoint module 204 may transmit any data for disk writes made by primary VM 202 during its execution to backup computer system 210. Similarly, in some embodiments, prior to the expiration of the timer, the hypervisor transmits all corresponding disk write completion messages to backup computer system 210, which receives the disk write data and completion messages in step 316.

Once the timer expires (e.g., 10 milliseconds has lapsed) in step 318, incremental checkpoint module 204 may initiate a checkpoint by stunning primary VM 202 (i.e., freezes its execution state) in step 320. In step 322, incremental checkpoint module 204 may generate a checkpoint information packet reflecting the current state of stunned primary VM 202 and transmit the checkpoint information packet to backup computer system 210. The checkpoint information packet may include state data reflecting the current state of one or more virtual devices of the stunned primary VM 202. In one embodiment, the checkpoint information packet includes state data reflecting the current state of those virtual devices of the stunned primary VM 202 that have changed state since a prior checkpoint (e.g., 10 milliseconds ago). Techniques for determining which virtual devices of the primary VM have changed state are described in greater detail later.

In step 324, incremental checkpoint module 214 of backup computer system 210 successfully receives the transmitted checkpoint information packet and may transmit an acknowledgement of successful receipt back to primary computer system 200. In one embodiment, once incremental checkpoint module 204 of primary computer system 200 receives the transmitted acknowledgement, the hypervisor may resume execution of primary VM 202 in step 334 and releases all the queued up network packets in step 336 before returning back to step 314. In some embodiments, once incremental checkpoint module 214 transmits the acknowledgement, in step 326, incremental checkpoint module 214 may commit to the virtual disk of backup VM 212 all disk write data received prior to the expiration of the timer for which the hypervisor also received a disk write completion signal.

In step 328, incremental checkpoint module 214 merges (i.e., integrates) the updated state reflected in the received checkpoint information packet (from step 324) into the current state of backup VM 212. Incremental checkpoint module 214 may modify the state data of backup VM 212 based on the received checkpoint information packet, which includes the state data for one or more virtual device. In one or more embodiments, incremental checkpoint module 214 copies updated state data for those virtual devices of primary VM 202 that have changed since a prior checkpoint into the current state of the backup VM 212, while leaving the state of the other virtual devices unchanged. In some embodiments, incremental checkpoint module 214 may determine which virtual devices of backup VM 212 to update based on an (explicit) indication in the received checkpoint information packet (e.g., a list or manifest specifying the changed virtual devices), or in other embodiments, implicitly, i.e., based on the presence of updated state data for some virtual devices but not others within the received checkpoint information packet.

Subsequently, in step 330, if backup computer system 210 detects that primary computer system 200 has failed, then in step 332, backup computer system 210 resumes execution of primary VM 202 as backup VM 212 from the last received (and acknowledged) checkpoint information packet. Delaying and queuing the outbound network packets in step 314 and releasing them only after an acknowledged checkpoint transaction in step 336 ensures that restoration of primary VM 202 by backup computer system 210 upon a failure of primary computer system 200 is based on a state of primary VM 202 that can properly resume network communications with external entities (i.e., re-transmit outbound network packets since the recovered state without confusing recipients, re-receive inbound network packets that it is expecting, etc.).

In one embodiment, generating a checkpoint information packet, as in step 322 of FIG. 3, may include at least two tasks: (1) capturing and transmitting modifications to the state of the virtual memory (e.g., virtual RAM 132) of primary VM 202 since the last checkpoint information packet transmitted to backup computer system 210, and (2) capturing and transmitting the current state of virtual devices 136 of primary VM 202 that were modified since the last checkpoint information packet transmitted to backup computer system 210. In one embodiment, upon completion of the foregoing two tasks, incremental checkpoint module 204 of primary computer system 200 transmits an end-of-checkpoint message to backup computer system 210 indicating completion of the transmission of the checkpoint information packet (e.g., packet $208_A$), which serves as a trigger for backup computer system 210 to transmit an acknowledgement of receipt. With respect to capturing the current state of the modified virtual devices 136, in some embodiments, when the timer expires in step 318 of FIG. 3, incremental checkpoint module 204 of primary computer system 200 may immediately stun primary VM 202 without waiting for any current "in-flight" disk I/O operations to complete. Once primary VM 202 is stunned, incremental checkpoint module 204 captures the state of modified emulated devices of primary VM 202 as well as the state of any in-flight disk I/O operations for transmission to backup computer system 210 as part of a checkpoint information packet 208. In this manner, although the in-flight disk I/O operations are not part of the actual checkpoint state (i.e., because they have not completed), a resumption of execution at the completed checkpoint state by backup VM 212 will result in the re-issuance of the in-flight disk I/O operations.

Figure 4:
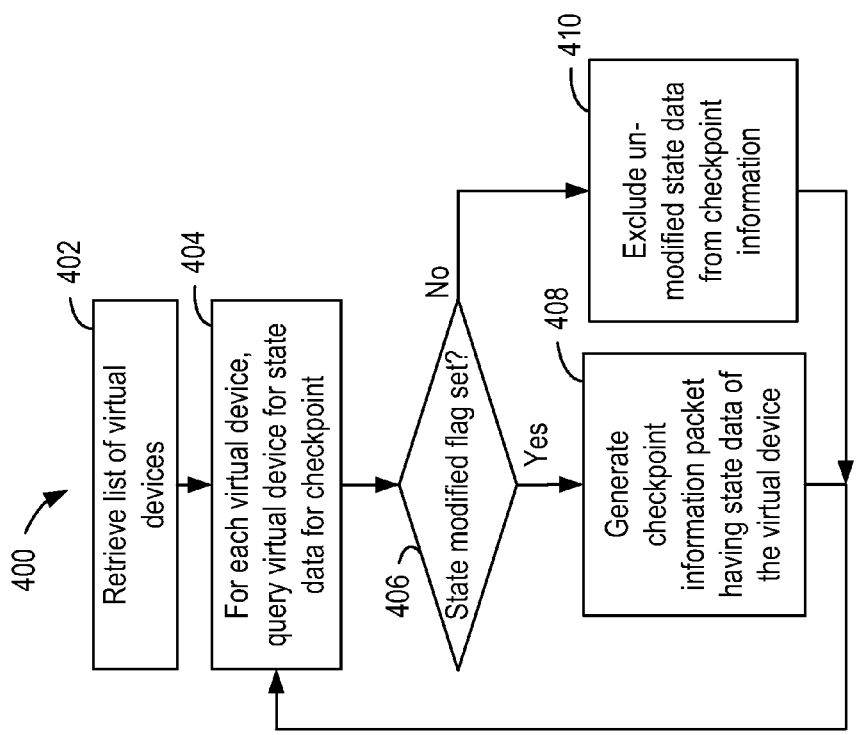
FIG. 4 is a flow diagram depicting a method for generating incremental checkpoints of a virtual machine that includes virtual device state data, according to one embodiment of the present disclosure.

FIG. 4 is a flow diagram depicting a method 400 for generating incremental checkpoints of virtual machines that include virtual device state data, according to one embodiment of the present disclosure. It should be recognized that the method 400 may be utilized to generate a checkpoint information packet, as in step 322 of FIG. 3, for transmission to a backup computer system or other suitable use. The method 400 begins at step 402, where incremental checkpoint module 204 retrieves a list of virtual devices 136 for a VM (e.g., primary VM 202). At step 404, for each virtual device 136, incremental checkpoint module 204 queries (e.g., via API call) each virtual device 136 for state data for generating a checkpoint.

At step 406, virtual device 136 (e.g., a virtual keyboard device) checks if the state of the virtual device has been modified since a prior checkpoint had been generated. In one embodiment, virtual device 136 determines whether a flag (e.g., "stateModified" flag) has been set indicating the state of the virtual device has been modified since a prior checkpoint. If so, i.e., responsive to determining the state-modified flag for the virtual device has been set, virtual device 136 returns data to incremental checkpoint module 204 representing a current state of the virtual device. At step 408, incremental checkpoint module 204 generates a checkpoint information packet having the returned state data of virtual device 136, and returns to step 404 to query another virtual device, if any. At step 410, the queried virtual device resets the state-modified flag so that the virtual device may track state changes for a next checkpoint. As shown in FIG. 4, incremental checkpoint module 204 returns to step 404 to query another virtual device 136, if any.

Otherwise, responsive to determining the state-modified flag has not been set, virtual device 136 returns an indication to incremental checkpoint module 204 that the state of the queried virtual device has not changed since a prior checkpoint. In some implementations, the indication that the state of the queried virtual device has not changed may be a zero or null value, or other reserved value. At step 414, responsive to receiving such an indication from the queried virtual device, incremental checkpoint module 204 excludes the (un-modified) state data from any generated checkpoint information packet, i.e., skipping the virtual device, and returns to step 404 to query another virtual device.

Accordingly, state data of virtual devices that have not been modified between checkpoints are not captured and transmitted as part of incremental checkpoint data, thereby reducing the amount of time utilized to capture modifications to the state of a VM (e.g., primary VM 202), particularly while VMs remain stunned. Furthermore, by reducing the amount of data in the checkpoint information packets, embodiments of the present disclosure further reduce the amount of network traffic needed to transmit the checkpoint information packets to backup computer system 210, as well as reduce the amount of time utilized to integrate checkpoint packet information (i.e., copy) into a current state of backup VM 212. As such, instead of transmitting state data for all of the plurality of virtual devices 136 (e.g., over 40 virtual devices) of the primary VM to the secondary VM as in conventional techniques for checkpointing, embodiments described herein may transmit checkpoint data containing state data from only, for example, the 3 (of 40 virtual devices) that have changed since a prior checkpoint.

Figure 5:
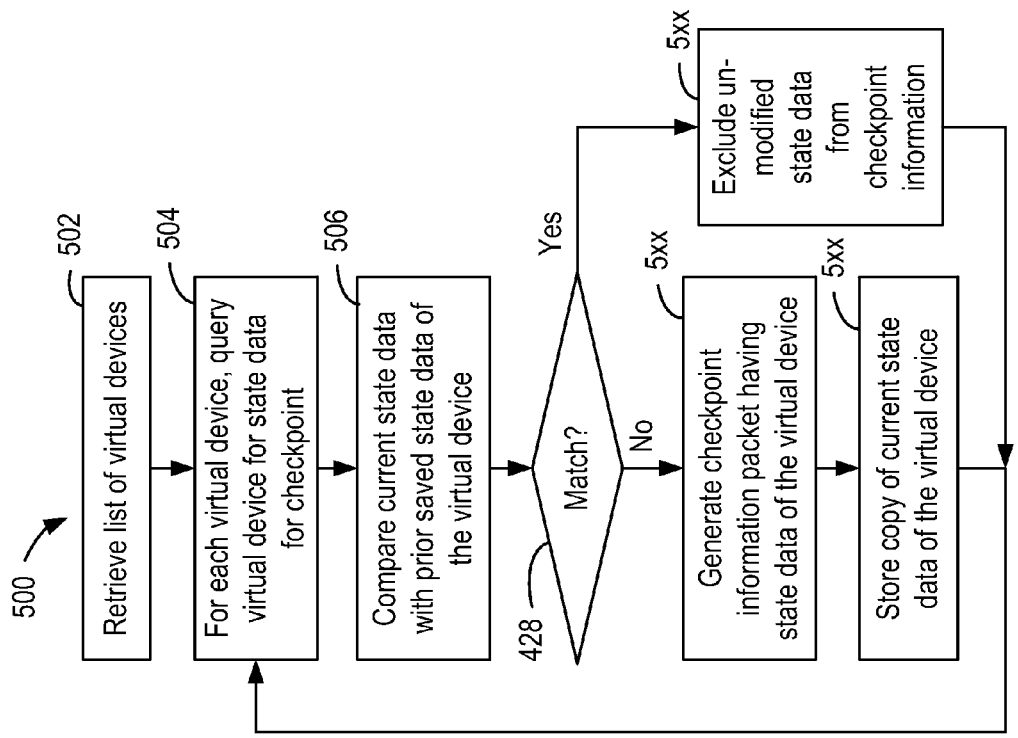
FIG. 5 is a flow diagram depicting a method for generating incremental checkpoints of a virtual machine that includes virtual device state data, according to another embodiment of the present disclosure.

FIG. 5 is a flow diagram depicting a method 500 for generating incremental checkpoints of virtual machines that include virtual device state data, according to another embodiment of the present disclosure. The method 500 begins at step 502, where incremental checkpoint module 204 retrieves a list of virtual devices 136 for a VM (e.g., primary VM 202). At step 504, for each virtual device 136, incremental checkpoint module 204 queries each virtual device 136 for state data for generating a checkpoint. The queried virtual device 136 checks if the state of the virtual device has been modified since a prior checkpoint had been generated.

In one embodiment, at step 506, the queried virtual device 136 compares the current state data of the virtual device with a copy of state data retained from a prior checkpoint. At step 508, if the values do not match, i.e., responsive to determining the current state data of the virtual device does not match state data saved from a prior checkpoint, virtual device 136 returns data to incremental checkpoint module 204 representing a current state of the queried virtual device. At step 510, incremental checkpoint module 204 generates a checkpoint information packet that includes the returned state data of the virtual device. At step 512, the queried virtual device retains a copy of the state data used to generate the checkpoint at step 510. In some embodiments, the queried virtual device may replace the previous copy of the state data with a copy of the current state data, for use in comparison in future incremental checkpoint operations. In other embodiments, the queried virtual device may retain a library of copies of state data for a pre-determined number of prior checkpoints. As shown in FIG. 5, incremental checkpoint module 204 returns to step 504 to query another virtual device 136, if any.

Referring back to step 508, responsive to determining that the current state data of the virtual device does indeed match state data saved from a prior checkpoint, virtual device 136 determines that the virtual device has not changed state and may return an indication to incremental checkpoint module 204 that the state of the queried virtual device has not changed since the prior checkpoint. At step 514, responsive to receiving such an indication from the queried virtual device, incremental checkpoint module 204 may exclude the un-modified state data from the checkpoint information being generated, and return to step 504 to query another virtual device 136.

While embodiments of the present disclosure are described in detail as a binary mechanism that determines whether a state of a virtual device has changed since a previous checkpoint operation (and checkpoints the entire virtual device as a result), it should be recognized that the embodiments described may be extended to track which parts of virtual device state has been changed between checkpoints. When such virtual devices are queried during a checkpoint operation, the virtual device may return data from only those portions of state data that have been changed. Accordingly, only these changed values may be transmitted to a secondary VM (e.g., backup VM 212) when an incremental checkpoint is taken.

For example, in one embodiment, a virtual device 136 may "partition" its state data into different portions and sets a value in a state-modified field whenever data in a particular portion of the state data has been changed. In one implementation, the state-modified field may contain a multi-bit value, where each bit of the value corresponds to a different portion of state data. In such an implementation, virtual device 136 may change a bit from 0 to 1 in the state-modified field when a portion of state data corresponding to the bit has been changed. In other embodiments, the state-modified field may contain a value from a range of reserved values, each reserved value identifying which portion of state data has been changed. When the virtual device is queried during a checkpoint operation, the virtual device identifies which portions of state data have been changed since a previous checkpoint based on the state-Modified field and returns data from only those identified portions.

In another example, in embodiments having a virtual device 136 configured to maintain a copy of the virtual device state from a prior checkpoint operation, the virtual device may generate a differential (i.e., "diff") based on a comparison between the current state of the virtual device to the state data saved from a prior checkpoint. When queried for a checkpoint operation, the virtual device may return the generated differential between the current state data and the state data from a prior checkpoint.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for generating a checkpoint for a virtual machine having a plurality of virtual devices, the method comprising:
generating a first checkpoint for a virtual machine (VM) comprises state data of the plurality of virtual devices; and
generating a second checkpoint for the VM, wherein the second checkpoint comprises state data of a first virtual device of the plurality of virtual devices that has changed since generation of the first checkpoint, wherein generating the second checkpoint for the VM further comprises:
querying a second virtual device of the plurality of virtual devices for state data; and
excluding state data of the second virtual device from the second checkpoint for the VM based on an indication returned from the second virtual device that the state of the second virtual device has not changed since generating the first checkpoint.

2. The method of claim 1, wherein generating the second checkpoint for the VM further comprises:

determining the state of the first virtual device has changed since generating the first checkpoint.

3. The method of claim 1, wherein generating the second checkpoint for the VM further comprises:
subsequent to generating the first checkpoint for the VM, detecting a change to state data of the first virtual device;
modifying a state flag associated with the first virtual device to indicate the state of the first virtual device has changed;
responsive to determining the state of the first virtual device has changed since generating the first checkpoint based on the state flag, providing a copy of state data of the first virtual device; and
resetting the state flag associated with the first virtual device.

4. The method of claim 1, wherein generating the first checkpoint for the VM further comprises storing a copy of state data for the first virtual device subsequent to generating the first checkpoint for the VM, wherein the first checkpoint comprises state data of the first virtual device; and
wherein generating the second checkpoint for the VM further comprises determining the state of the first virtual device has changed since generating the first checkpoint based on a comparison between the copy of state data and a current device state for the first virtual device.

5. The method of claim 4, further comprising:
storing a second copy of state data representing the current device state for the first virtual device.

6. The method of claim 1, further comprising:
transmitting the second checkpoint to a backup computer system executing a backup VM associated with the VM; and
modifying, by operation of the backup computer system, state data of the backup VM based on the second checkpoint including the state data for the first virtual device.

7. A non-transitory computer-readable storage medium comprising instructions that, when executed in a computing device, generate a checkpoint for a virtual machine having a plurality of virtual devices, by performing the steps of:
generating a first checkpoint for a virtual machine (VM) comprises state data of the plurality of virtual devices; and
generating a second checkpoint for the VM, wherein the second checkpoint comprises state data of a first virtual device of the plurality of virtual devices that has changed since generation of the first checkpoint, wherein the step of generating the second checkpoint for the VM further comprises:
querying a second virtual device of the plurality of virtual devices for state data; and
excluding state data of the second virtual device from the second checkpoint for the VM based on an indication returned from the second virtual device that the state of the second virtual device has not changed since generating the first checkpoint.

8. The non-transitory computer-readable storage medium of claim 7, wherein the step of generating the second checkpoint for the VM further comprises:
determining the state of the first virtual device has changed since generating the first checkpoint.

9. The non-transitory computer-readable storage medium of claim 7, wherein the step of generating the second checkpoint for the VM further comprises:
subsequent to generating the first checkpoint for the VM, detecting a change to state data of the first virtual device;
modifying a state flag associated with the first virtual device to indicate the state of the first virtual device has changed;
responsive to determining the state of the first virtual device has changed since generating the first checkpoint based on the state flag, providing a copy of state data of the first virtual device; and
resetting the state flag associated with the first virtual device.

10. The non-transitory computer-readable storage medium of claim 7, wherein the step of generating the first checkpoint for the VM further comprises storing a copy of state data for the first virtual device subsequent to generating the first checkpoint for the VM, wherein the first checkpoint comprises state data of the first virtual device; and
wherein the step of generating the second checkpoint for the VM further comprises determining the state of the first virtual device has changed since generating the first checkpoint based on a comparison between the copy of state data and a current device state for the first virtual device.

11. The non-transitory computer-readable storage medium of claim 10, further comprising storing a second copy of state data representing the current device state for the first virtual device.

12. The non-transitory computer-readable storage medium of claim 7, further comprising:
transmitting the second checkpoint to a backup computer system executing a backup VM associated with the VM; and
modifying, by operation of the backup computer system, state data of the backup VM based on the second checkpoint including the state data for the first virtual device.

13. A computer system executing a virtual machine having a plurality of virtual devices, the computer system comprising:
a memory device;
a processor programmed to carry out the steps of:
generating a first checkpoint for a virtual machine (VM) comprises state data of the plurality of virtual devices; and
generating a second checkpoint for the VM, wherein the second checkpoint comprises state data of a first virtual device of the plurality of virtual devices that has changed since generation of the first checkpoint;
querying a second virtual device of the plurality of virtual devices for state data; and
excluding state data of the second virtual device from the second checkpoint for the VM based on an indication returned from the second virtual device that the state of the second virtual device has not changed since generating the first checkpoint.

14. The computer system of claim 13, wherein the processor programmed to carry out the step of generating the second checkpoint for the VM is further programmed to carry out the steps of:
determining the state of the first virtual device has changed since generating the first checkpoint.

15. The computer system of claim 13, wherein the processor programmed to carry out the step of generating the second checkpoint for the VM is further programmed to carry out the steps of:
subsequent to generating the first checkpoint for the VM, detecting a change to state data of the first virtual device;
modifying a state flag associated with the first virtual device to indicate the state of the first virtual device has changed;

responsive to determining the state of the first virtual device has changed since generating the first checkpoint based on the state flag, providing a copy of state data of the first virtual device; and resetting the state flag associated with the first virtual device.

16. The computer system of claim 13, wherein the processor programmed to carry out the step of generating the first checkpoint for the VM is further programmed to carry out the steps of:

storing a copy of state data for the first virtual device subsequent to generating the first checkpoint for the VM, wherein the first checkpoint comprises state data of the first virtual device; and wherein the processor programmed to carry out the step of generating the second checkpoint for the VM is further programmed to carry out the steps of:

generating the second checkpoint for the VM further comprises determining the state of the first virtual device has changed since generating the first checkpoint based on a comparison between the copy of state data and a current device state for the first virtual device.

17. The computer system of claim 16, wherein the processor is further programmed to carry out the steps of:

storing a second copy of state data representing the current device state for the first virtual device.

18. The computer system of claim 13, wherein the processor is further programmed to carry out the steps of:

transmitting the second checkpoint to a backup computer system executing a backup VM associated with the VM; and modifying, by operation of the backup computer system, state data of the backup VM based on the second checkpoint including the state data for the first virtual device.

* * * * *